US009213608B2

(12) United States Patent
Busaba et al.

(10) Patent No.: US 9,213,608 B2
(45) Date of Patent: *Dec. 15, 2015

(54) HARDWARE RECOVERY IN MULTI-THREADED PROCESSOR

(71) Applicant: International Business Machines Corporation, Armonk, NY (US)

(72) Inventors: Fadi Y. Busaba, Poughkeepsie, NY (US); Steven R. Carlough, Wappingers Falls, NY (US); Christopher A. Krygowski, Lagrangeville, NY (US); Brian R. Prasky, Wappingers Falls, NY (US); Chung-Lung K. Shum, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 253 days.

This patent is subject to a terminal disclaimer.

(21) Appl. No.: 13/790,705

(22) Filed: Mar. 8, 2013

(65) Prior Publication Data

US 2013/0191684 A1 Jul. 25, 2013

Related U.S. Application Data

(63) Continuation of application No. 13/548,448, filed on Jul. 13, 2012.

(51) Int. Cl.
*G06F 11/00* (2006.01)
*G06F 11/14* (2006.01)
*G06F 9/38* (2006.01)

(52) U.S. Cl.
CPC .......... *G06F 11/1479* (2013.01); *G06F 9/3851* (2013.01); *G06F 9/3863* (2013.01); *G06F 11/1405* (2013.01); *G06F 11/1497* (2013.01)

(58) Field of Classification Search
CPC .................. G06F 11/1438; G06F 11/1479
See application file for complete search history.

(56) References Cited

U.S. PATENT DOCUMENTS

| 6,681,345 B1 | 1/2004 | Storino et al. |
| 7,017,073 B2 | 3/2006 | Nair et al. |

(Continued)

OTHER PUBLICATIONS

Greskamp, B.-et al.; "Paceline: Improving single-thread performance in nanoscale CMPs through core overclocking"; 16th Int'l Conference On Parallel Architectures & Compilation Techniques; pp. 194-205; IEEE; 2007.
Anonymous; "Method for multiple thread priority support in multithreaded processors"; http://www.ip.com/pubview/IPCOM000137910D; Jun. 29, 2006.

(Continued)

*Primary Examiner* — Michael Maskulinski
(74) *Attorney, Agent, or Firm* — Cantor Colburn LLP; Margaret McNamara

(57) ABSTRACT

A computer system includes a simultaneous multi-threading processor and memory in operable communication with the processor. The processor is configured to perform a method including running multiple threads simultaneously, detecting a hardware error in one or more hardware structures of the processing circuit, and identifying one or more victim threads of the multiple threads. The processor is further configured to identify a plurality of hardware structures associated with execution of the one or more victim threads, isolate the one or more victim threads from the rest of the multiple threads by preventing access to the plurality of hardware structures by the multiple threads, flush the one or more victim threads by resetting hardware states of the plurality of hardware structures, and restore the one or more victim threads by restoring the plurality of hardware structures to a known safe state.

8 Claims, 7 Drawing Sheets

(56) References Cited

U.S. PATENT DOCUMENTS

| | | | |
|---|---|---|---|
| 7,111,196 B2 | 9/2006 | Balazich et al. | |
| 7,243,262 B2 | 7/2007 | Mukherjee et al. | |
| 7,343,602 B2 | 3/2008 | Luk et al. | |
| 7,370,243 B1 | 5/2008 | Grohoski et al. | |
| 7,373,548 B2 | 5/2008 | Reinhardt et al. | |
| 7,676,655 B2 * | 3/2010 | Jordan | 712/214 |
| 7,827,443 B2 | 11/2010 | Eisen et al. | |
| 2008/0082893 A1 | 4/2008 | Wang | |
| 2013/0275989 A1 * | 10/2013 | Xu et al. | 718/104 |

OTHER PUBLICATIONS

Ruzek, G.-et al.; "Algorithm to Implement Multi-threaded Fairness for a Single Threaded SCSI Controller"; http://www.ip.com/pubview/IPCOM000107595D; Mar. 1, 1992.

Tsuchiya, K.-et al.; "I/O Device Error Processing in a Multi-Threaded Instruction-Unit Design"; http://www.ip.com/pubview/IPCOM00013873D; Nov. 1, 1999.

Wang, L.-et al.; "Reducing error accumulation effect in multithreaded memory systems"; IEEE Int'l Symposium On Circuits & Systems; 4pp.; 2006.

* cited by examiner

HARDWARE RECOVERY IN MULTI-THREADED PROCESSOR

CROSS-REFERENCE TO RELATED APPLICATIONS

This is a continuation application of and claims priority from U.S. application Ser. No. 13/548,448, filed on Jul. 13, 2012, the entire contents of which are incorporated herein by reference.

BACKGROUND

The present invention relates to hardware recovery in a multi-threaded processor, and more particularly to a processor configured to detect errors in one thread and restore the thread while allowing other threads to continue executing uninterrupted.

Hardware recovery has been used to restore a processor to a known good or safe state after an error occurs. During a recovery process, which may last for thousands of CPU cycles, a processor first detects an error occurrence, stops executing an instruction stream, clears out an internal corrupted state, restores itself to a known error-free state, and restarts instruction processing from a point where the instruction last halted. However, during the recovery process, program flow is interrupted as the corrupted state is cleared and a known good state (or a hardware checkpoint state) is restored. Such hardware-based process keeps the error recovery transparent from the software application/operations.

Processors may be configured to execute one thread of instructions at a time or multiple threads at the same time. Processors configured to execute multiple threads simultaneously are said to be in simultaneous multithreading (SMT) mode. In simultaneous multithreading mode, hardware resources are shared among multiple software threads executing on a machine. Furthermore, in superscalar processors, multiple execution pipelines may be shared among the threads being dispatched into the hardware. Though SMT provides an efficiency of hardware by allowing multiple threads to rapidly share the execution resources available, it comes with a performance cost of the individual threads since resource contention issues may arise between simultaneously-executing threads. Conventional hardware error recovery that works on a processor does not work well on processors running multithreading as any error detected requires that the recovery process be applied to all the running threads although the error may be isolated to a single running thread.

SUMMARY

Exemplary embodiments include a computer program product including a tangible storage medium readable by a processing circuit and storing instructions for execution by the processing circuit for performing a method. The method includes running multiple threads simultaneously by the processing circuit, where each thread corresponds to a series of instructions, detecting a first hardware error in one or more hardware structures of the processing circuit, and identifying one or more victim threads of the multiple threads, the victim threads being associated with the one or more hardware structures. The method further includes identifying a plurality of hardware structures holding information associated with execution of the one or more victim threads by the processing circuit, isolating the one or more victim threads from the rest of the multiple threads by halting checkpointing of the one or more victim threads and preventing access to information held in the plurality of hardware structures by the multiple threads, and flushing the one or more victim threads by resetting hardware states of the plurality of hardware structures. The method further includes restoring the one or more victim threads by restoring the plurality of hardware structures to a known safe state and restarting instruction processing.

Additional exemplary embodiments include a computer-implemented method including running, with a simultaneous multi-threading processor, multiple threads simultaneously, where each thread corresponds to a series of instructions, detecting a first hardware error in one or more hardware structures of the processor, and identifying one or more first victim threads of the multiple threads, the one or more first victim threads being associated with the one or more hardware structures. The method further includes identifying a plurality of hardware structures holding information associated with an execution of the one or more first victim threads by the processor, isolating the one or more first victim threads from the rest of the multiple threads by halting checkpointing of the one or more victim threads and preventing access to information held in the plurality of hardware structures by the multiple threads, and flushing the one or more first victim threads by resetting hardware states of the plurality of hardware structures. The method further includes restoring the one or more first victim threads by restoring the plurality of hardware structures to a known safe state and restarting instruction processing.

Further exemplary embodiments include a computer-implemented method including running, with a simultaneous multi-threading processor, multiple threads simultaneously, where each thread corresponds to a series of instructions, detecting a first hardware error in one or more hardware structures of the processor, and identifying one or more first victim threads of the multiple threads. The one or more first victim threads are associated with the one or more hardware structures. The method further includes identifying a plurality of hardware structures holding information associated with an execution of the one or more first victim threads by the processor, isolating the one or more first victim threads from the rest of the multiple threads by preventing access to the information held in the plurality of hardware structures by the multiple threads, and flushing the one or more first victim threads by resetting hardware states of the plurality of hardware structures. The method further includes restoring the one or more first victim threads by restoring the plurality of hardware structures to a known safe state and restarting instruction processing.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

In exemplary embodiments, a simultaneous multi-threading processor detects hardware errors in a running processor, isolates a thread or threads that are affected by the error, and flushes and restores the affected thread(s) without affecting the operation of the remaining threads.

Figure 1:
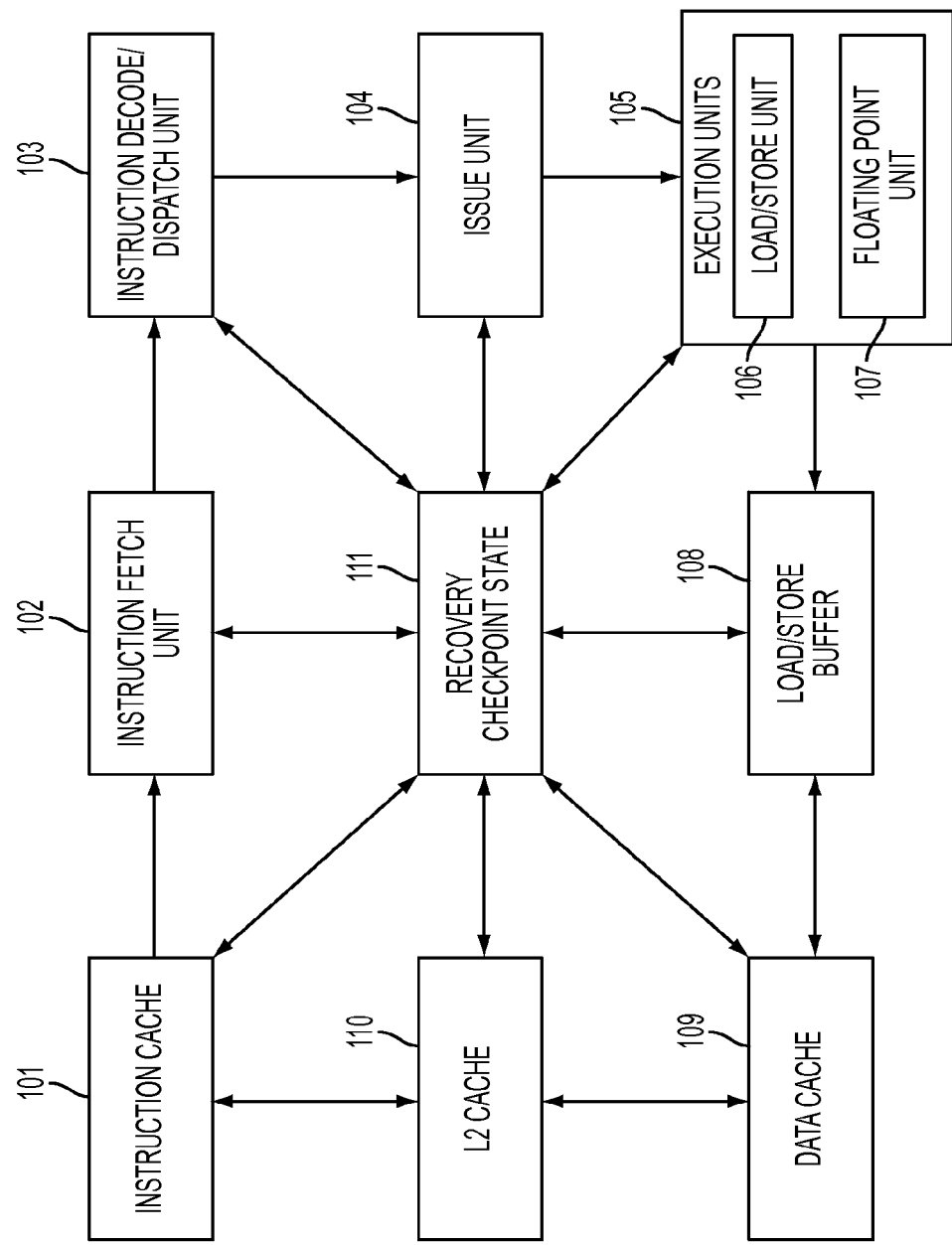
FIG. 1 illustrates a hardware recovery system according to one embodiment.

FIG. 1 illustrates a block diagram of a hardware recovery system 100 according to an embodiment. The hardware recovery system 100 includes functional units to process a thread of a program and a recovery checkpoint state unit 111. The thread may be one thread of a multi-thread processor or a simultaneous multi-thread (SMT) processor and one or more functional units may be shared among multiple threads of the processor. In addition, multiple threads may be executed simultaneously using the same functional units, or separate functional units having the same functions as illustrated in FIG. 1. In the present specification and claims, a thread is a series of instructions in a program that may be executed independently of other threads in the program. The thread is executed by hardware components configured to store, fetch, decode, and execute instructions. Each thread of a program may be independent of each other thread. In other words, the instruction executed in each thread may not be dependent upon the execution of instructions of other threads.

The hardware recovery system 100 includes an instruction cache 101 configured to store instructions, an instruction fetch unit 102 to fetch instructions from the instruction cache 101, and an instruction decode and dispatch unit 103 configured to decode and dispatch the fetched instruction to an issue queue. An issue unit 104 pulls out an instruction from the issue queue in out-of-program order and issues them to the execution units 105. The execution units 105 include any number of execution units configured to execute issued instructions that can perform among other things logical operations, arithmetic operations, shift/rotate functions, etc. Example execution units include a load/store unit 106 to execute a load or store instruction and a floating point unit 107 to execute floating point operations. Although only two types of execution units are illustrated in FIG. 1 for purposes of description, it is understood that a number and type of execution units may be included in a processor according to the design considerations of the processor.

Using the load/store unit 106 as an example, a result of an executed store operation may be stored in a buffer 108 prior to being sent to the data cache 109. If a store instruction is flushed, such as when it is determined to be on a wrong branch path, its corresponding data in the storage buffer 108 is flushed. Once the store completes without any detected error (i.e. beyond a point where the data can be flushed), the data is transferred from the storage buffer 108 to the data cache 109, and eventually to the L2 cache 110. The storage data of the store instruction becomes part of the checkpointed state after the instruction completes and its data is checked for errors. A younger or more recently fetched or executed load instruction corresponding to the same memory location as a previous store instruction may bypass the storage buffer prior to completion of the store instruction. Data corresponding to the result of the load/store operation may be stored in a data cache 109. The data may then be transferred to and stored in L2 cache 110. The buffer 108 may further transmit the results of the executed instruction to cache, such as L2 cache 110 of the processor. The L2 cache 110 is a high-level cache that may store both data and instructions. The instructions may be transferred between the instruction cache 101 and the L2 cache 110, and the data may be transferred between the L2 cache 110 and the data cache 109. Another example on instruction execution completion is for instructions to be executed in the floating point unit 107 based on a floating point instruction that adds the two operands from floating point registers (FPRs) and stores the result away in an FPR. Once the instruction completes executing the result of the instruction that updates the FPR where data can then be checkpointed.

At each component or stage of the processor executing the thread, an error may occur, such as a bit flip (from 0 to 1 or from 1 to 0), an illegal or invalid hardware state, a stall condition or a condition is which there is no forward progress in completing instructions, a transient error or any other error which prevents the thread from proceeding to a next state or which would corrupt data or states of the thread or another thread sharing the same components. The recovery checkpoint state unit 111 stores a known safe state of the thread, and when an error is detected, each component executing the thread may be flushed of its present value or values and restored to the state stored in the recovery checkpoint state unit 111. It is known that some hardware detected errors are automatically corrected by Error Correction Logic (ECC) without the error being observed by other units of the recovery system 100, and as a result these errors do not require any hardware recovery. They types of errors are often referred to as correctable errors. For example, the data in the L2 cache 110 is error-protected due to a single (or multiple) bit flip such that this error is automatically corrected before being observed by a running thread, and does not require any hardware error recovery as the state of the thread is still intact and not corrupted. Error correction logic takes up a lot of space and is primarily employed on large caches and on recovery checkpointed hardware states.

In exemplary embodiments, one or more of the instruction cache 101, the instruction fetch unit 102, the instruction decode/dispatch unit 103, the issue unit 104, the execution units 105, the load/store buffer 108, the data cache 109 and the L2 cache 110 may be either shared among multiple threads or may be dedicated to only one thread. When the component is dedicated to only one thread, detecting an error results in a simple identification of the victim thread. When the component is shared among multiple threads, thread number bits may be provided in the recovery checkpoint state unit 111 or in another memory, register, or other component to identify to the thread that is utilizing the component. In the present specification and claims, a victim thread is defined as a thread associated with processing component in which an error or fault is detected. For example, if threads are sharing register file, an entry used by a thread is tagged with the thread number. When an error is detected in the data when reading or writing the register file, the error can be easily attributed to a thread. However, if the hardware error is in shared logic forming the address to the register file, then the error cannot be attributed to a specific thread.

When the victim thread is identified, the victim thread is isolated by preventing any other thread from accessing the data belonging to the victim thread, including data stored in data registers and buffers such as storage buffers. In addition, the victim thread is isolated by preventing any other thread from using contents of shared hardware structures, such as address translations in a translation look-aside buffer (TLB) that are utilized by the victim thread even after flushing the victim thread, until the state of victim thread is reloaded. As a result, other threads are protected from being corrupted as the state of the victim thread is prevented from being observed or seen by the other running threads so running threads logic cannot make decisions based on wrong information. In addition, the remaining threads may be processed and executed while the victim thread is isolated, flushed and restored. In other words, in a processor in which multiple threads are simultaneously run, the isolation, flushing, and restoring of one of the threads does not prevent the remaining threads from continuing to execute on resources that are not being flushed and restored.

Figure 2:
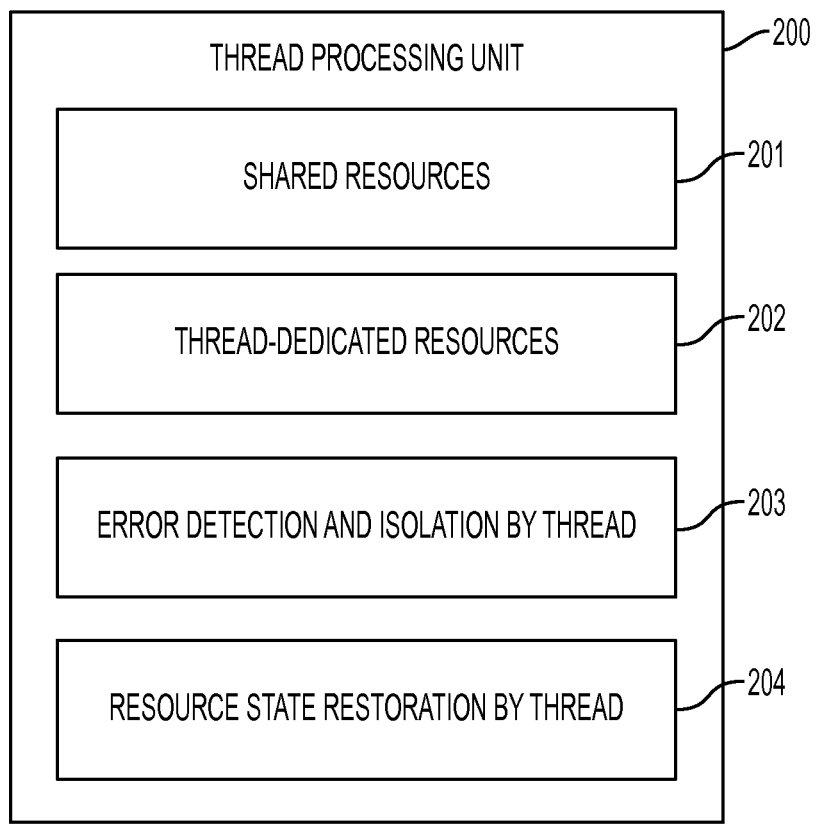
FIG. 2 illustrates a thread execution unit according to an embodiment.

FIG. 2 illustrates a block diagram of a thread processing unit 200 according to one embodiment. The thread processing unit 200 may correspond to any one of the functional units illustrated in FIG. 1, such as the instruction fetch unit 102, the instruction decode/dispatch unit 103, one or more of the execution units 104, etc. The thread processing unit 200 includes shared resources 201, thread-dedicated resources 202, an error-detection and isolation-by-thread block 203, and a resource state restoration-by-thread block 204. The error detection and isolation-by-thread block 203 represents circuitry in a processing unit configured to detect one or more error states in hardware, such as a stall state, illegal state, or other error state that would result in incorrect or corrupted data or states on the thread. The resource state restoration-by-thread block 204 represents circuitry including memory configured to store states of the hardware as the hardware executes the thread, such as register and memory contents, and to provide the stored states to the shared resources 201 and thread-dedicated resources 202 to restore the hardware to a known safe or uncorrupted state of execution of the thread. The shared resources 201 may be shared by multiple threads being processed by the thread processing unit 200, and in some embodiments, the shared resources 201 may be shared among multiple functional units, such as the instruction fetch unit 102, the instruction decode/dispatch unit 103, one or more of the execution units 104, etc.

Figure 3:
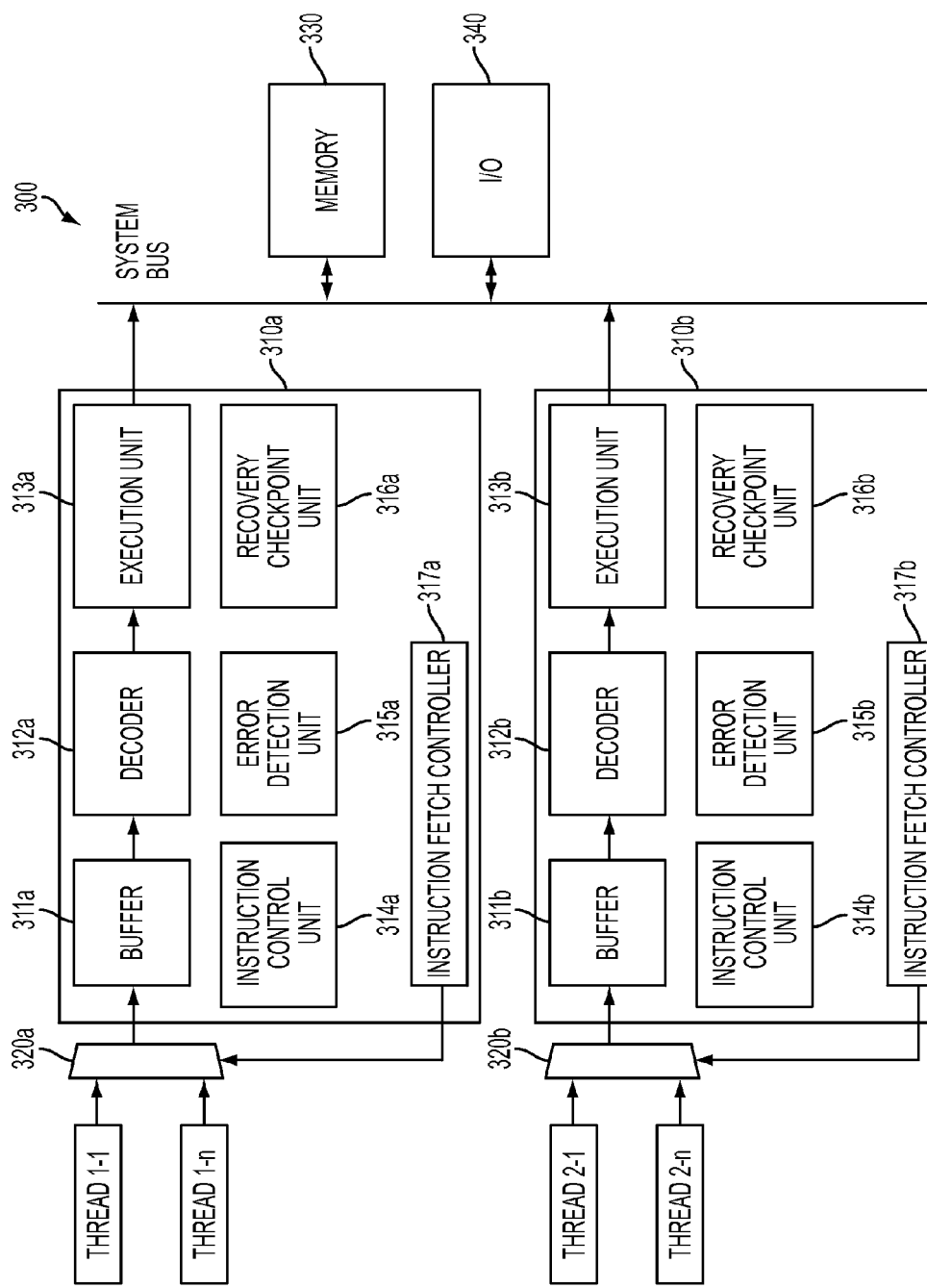
FIG. 3 illustrates a simultaneous multi-threading system according to one embodiment.

In exemplary embodiments, a processor may be a multi-core processor that processes multiple threads simultaneously. In other embodiments, a single core simultaneously executes multiple threads. In yet another embodiment, the processor is a multi-core processor and each core executes multiple threads. FIG. 3 illustrates an example of a simultaneous multi-threading (SMT) system 300 including multiple thread processing units 310 according to an embodiment. Each thread processing unit 310 may correspond to the thread execution unit 200 of FIG. 2, and the hardware recovery system 100 of FIG. 1.

The SMT system 300 includes multiple thread processing units 310a and 310b. The thread processing units 310a and 310b may correspond to separate cores of a multi-core processor or multiple processing parts of a single processing core. Although only two thread processing units are illustrated for purposes of description, it is understood that embodiments of the present invention encompass any number of thread processing units. Each thread processing unit 310 may include memory and operation units for storing, decoding, and executing instructions, operands, and other data. In addition, each thread processing unit 310 may include error detection circuitry and thread restoration circuitry.

In particular, the first thread processing unit 310a includes a buffer 311a for receiving an instruction from an external instruction storage and storing the instruction for processing. A decoder 312a decodes the instruction, and an execution unit 313a executes the instruction. A result of the executed instruction may be stored in memory, such as a buffer or cache memory located within the thread processing unit 310a or may be transmitted to a system bus to be stored in system memory 330 or output to an external device via an input/output (I/O) circuit 340.

An instruction fetch controller 317a may control a multiplexing unit 320a to fetch a particular instruction from multiple threads 1-1 to 1-n for further processing. The threads 1-1 to 1-n may be stored in an instruction cache, for example, and may correspond to threads that may be processed in parallel or simultaneously. An instruction control unit 314a may control operations of the first thread processing unit 310a, including instruction fetching, decoding, and executing. For example, when one instruction is executed by the execution unit 313a, the instruction control unit 314a may determine a next instruction to be fetched by the instruction fetch controller 317a.

The first thread processing unit 310a further includes an error detection unit 315a. The error detection unit 315a may detect errors in any component of the first thread processing unit 310a including the buffer 311a, decoder 312a, execution unit 313a, instruction control unit 314a, and instruction fetch controller 317a. In addition, while various components of the first thread processing unit 310a are illustrated in FIG. 3 for purposes of description, it is understood that embodiments of the present invention encompass thread processing units having additional components or omitting one or more of the illustrated components. The errors detected by the error detection unit 315a may include, for example, a stalled thread, or a thread that is not progressing, an illegal state of a component, or any other error that would generate corrupted data.

Upon detecting an error, the error detection unit 315a may identify the victim thread and isolate the victim thread. In particular, the error detection unit 315a may determine whether a component in which an error was detected is a shared resource among multiple threads, or a dedicated resource to only one thread. For example, in one embodiment, one or more of the buffer 311a, decoder 312a, execution unit 313a, instruction control unit 314a, and instruction fetch controller 317a is shared among multiple thread processing units 310 or multiple threads of a same thread processing unit 310.

If the error detection unit 315a determines that the component in which the error was detected is corresponds to only one thread, then the victim thread is easily identified, and the components associated with the victim thread are isolated. In other words, other threads are prevented from using contents from these components associated with the victim thread. However, the other threads that do not share resources with the thread associated with a component having an error may continue to process instructions without interruption.

On the other hand, if the error detection unit 315a determines that the component in which the error was detected is a shared resource among multiple threads, the error detection unit 315a determines which thread presently corresponds to the component by referring to a thread number bit associated with the component. For example, the first thread processing unit 310a may include a thread-tracking register having bits that correspond to each shared resource of the thread processing unit 310a. A number of bits may be assigned to each resource sufficient to provide a unique thread number to each thread that shares the resource. When a thread utilizes the resource, the thread number bit is altered to correspond to the thread that is presently utilizing the resource. When an error is detected in the resource, the error detection unit 315a may access the thread-tracking register to determine which thread is presently using the resource.

For example, if it is determined that the decoder 312a is in a stalled state, the error detection unit 315a may detect the error in the decoder 312a and identify one or more threads that are decoded by the decoder 312a. The one or more threads correspond to victim threads that may be affected by the error in the decoder 312a. The one or more victim threads are isolated by preventing any threads from utilizing any hardware associated with the one or more victim threads, including any buffer 311a, decoder 312a, execution unit 313a, instruction control unit 314a, or instruction fetch controller 317a utilized by the one or more victim threads.

The recovery checkpoint unit 316a saves the architected and micro-architected states of each of the threads. The state of a thread includes among other things the value of control registers, general purpose registers, instruction address and program status word, and processor state where the threads are executing (i.e. hardware configuration switches as well as disable and workaround switches). Part or all of the architected and micro-architected state of the threads may be shadowed for each of access in components associated with the thread including the buffer 311a, decoder 312a, execution unit 313a, instruction control unit 314a, instruction fetch controller 317a, and any other memory locations, registers, and logic circuitry. The thread states saved in the recovery checkpoint unit 316a may be states that are known to be safe, uncorrupted, and error-free. The recovery checkpoint unit 316a restores to the respective components the known safe state and the components are able to again execute the thread. The restoration may occur through broadcasting the value of each register that is part of the thread state through a bus or multiple buses that feeds all the units.

For example, the decoder 312a may include a translation look-aside buffer (TLB) configured to translate a virtual address generated by a program into a physical address to access storage, and the TLB may be shared by multiple threads to avoid unnecessary duplication of translations. When it is determined that the TLB is dedicated only to one thread, the thread's TLB entries are purged and restored to a safe level. However, when it is determined that the TLB is a shared resource, the entire TLB may be purged if it is determined that a detected error originated from the TLB.

In exemplary embodiments, hardware components are analyzed for errors, and the errors are isolated to the one or more particular victim threads associated with hardware components in which the error was detected. In other words, when an error is detected in a component, a thread associated with the component is identified and isolated instead of performing an action on each thread or threads that are not associated with the component having the error. While FIG. 3 illustrates each thread processing unit 310 having a separate error detection unit 315a, it is understood that embodiments of the present invention encompass examples in which a single error detection unit 315 is shared by multiple thread processing units 310 and detects errors of components associated with multiple threads. However, even when the error detection unit 315 is configured to be shared by multiple thread processing units or processor cores, the error detection unit 315 still detects hardware errors of each individual thread and isolates the one or more threads associated with the hardware errors, while permitting other threads to continue processing.

While the first thread processing unit 310a has been described above in detail, the second thread processing unit 310b includes the same features as the first thread processing unit 310a, and thus the second thread processing unit 310b will not be described in additional detail. In addition, while separate functional units are illustrated for each of the thread processing unit 310a and 310b, embodiments of the present disclosure encompass SMT systems 300 in which physical functional structures, such as a same buffer 311, decoder 312, execution unit 313, etc. is shared among multiple thread processing units 310.

Figure 4:
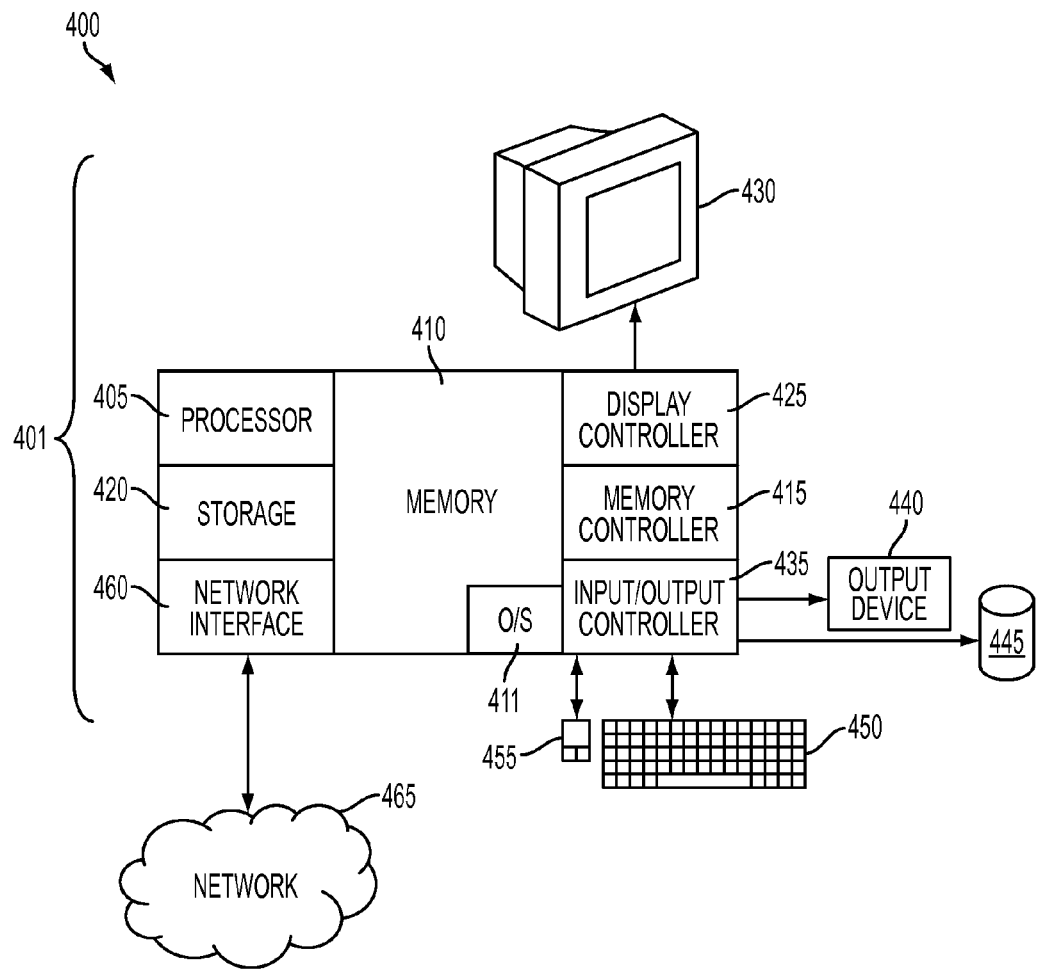
FIG. 4 illustrates a computer system according to one embodiment.

FIG. 4 illustrates a block diagram of a system 400 for hardware recovery of a single thread in a multi-threaded processor 405. The methods described herein can be implemented in hardware, software (e.g., firmware), or a combination thereof. In an exemplary embodiment, the methods described herein are implemented in hardware as part of the microprocessor of a special or general-purpose digital computer, such as a personal computer, workstation, minicomputer, or mainframe computer. The system 400 therefore includes a general-purpose computer 401.

In an exemplary embodiment, in terms of hardware architecture, as shown in FIG. 4, the computer 401 includes a multi-threaded processor 405, memory 410 coupled to a memory controller 415, and one or more input and/or output (I/O) devices 440, 445 (or peripherals) that are communicatively coupled via a local input/output controller 435. The input/output controller 435 can be, for example but not limited to, one or more buses or other wired or wireless connections, as is known in the art. The input/output controller 435 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 405 is a hardware device for executing software, particularly that stored in storage 420, such as cache storage, or memory 410. The processor 405 can be any custom made or commercially available processor, a central processing unit (CPU), an auxiliary processor among several processors associated with the computer 401, a semiconductor based microprocessor (in the form of a microchip or chip set), a macroprocessor, or generally any device for executing instructions. The processor 405 is a multi-threading processor, and may further be a multi-core processor. Each core of the multi-core processor may be a multi-threading core.

The memory 410 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 410 may incorporate electronic, magnetic, optical, and/or other types of storage media. Note that the memory 410 can have a distributed architecture, where various components are situated remote from one another, but can be accessed by the processor 405.

The instructions in memory 410 may include one or more separate programs, each of which comprises an ordered listing of executable instructions for implementing logical functions. In the example of FIG. 4, the instructions in the memory 410 a suitable operating system (OS) 411. The operating system 411 essentially controls the execution of other computer programs and provides scheduling, input-output control, file and data management, memory management, and communication control and related services.

In an exemplary embodiment, a conventional keyboard 450 and mouse 455 can be coupled to the input/output controller 435. Other output devices such as the I/O devices 440, 445 may include input devices, for example but not limited to a printer, a scanner, microphone, and the like. Finally, the I/O devices 440, 445 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The system 400 can further include a display controller 425 coupled to a display 430. In an exemplary embodiment, the system 400 can further include a network interface 460 for coupling to a network 465. The network 465 can be an IP-based network for communication between the computer 401 and any external server, client and the like via a broadband connection. The network 465 transmits and receives data between the computer 401 and external systems. In an exemplary embodiment, network 465 can be a managed IP network administered by a service provider. The network 465 may be implemented in a wireless fashion, e.g., using wireless protocols and technologies, such as WiFi, WiMax, etc. The network 465 can also be a packet-switched network such as a local area network, wide area network, metropolitan area network, Internet network, or other similar type of network environment. The network 465 may be a fixed wireless network, a wireless local area network (LAN), a wireless wide area network (WAN) a personal area network (PAN), a virtual private network (VPN), intranet or other suitable network system and includes equipment for receiving and transmitting signals.

If the computer 401 is a PC, workstation, intelligent device or the like, the instructions in the memory 410 may further include a basic input output system (BIOS) (omitted for simplicity). The BIOS is a set of essential software routines that initialize and test hardware at startup, start the OS 411, and support the transfer of data among the hardware devices. The BIOS is stored in ROM so that the BIOS can be executed when the computer 401 is activated.

When the computer 401 is in operation, the processor 405 is configured to execute instructions stored within the memory 410, to communicate data to and from the memory 410, and to generally control operations of the computer 401 pursuant to the instructions.

In an exemplary embodiment, where hardware recovery for a thread is implemented in hardware, the hardware recovery methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Figure 5:
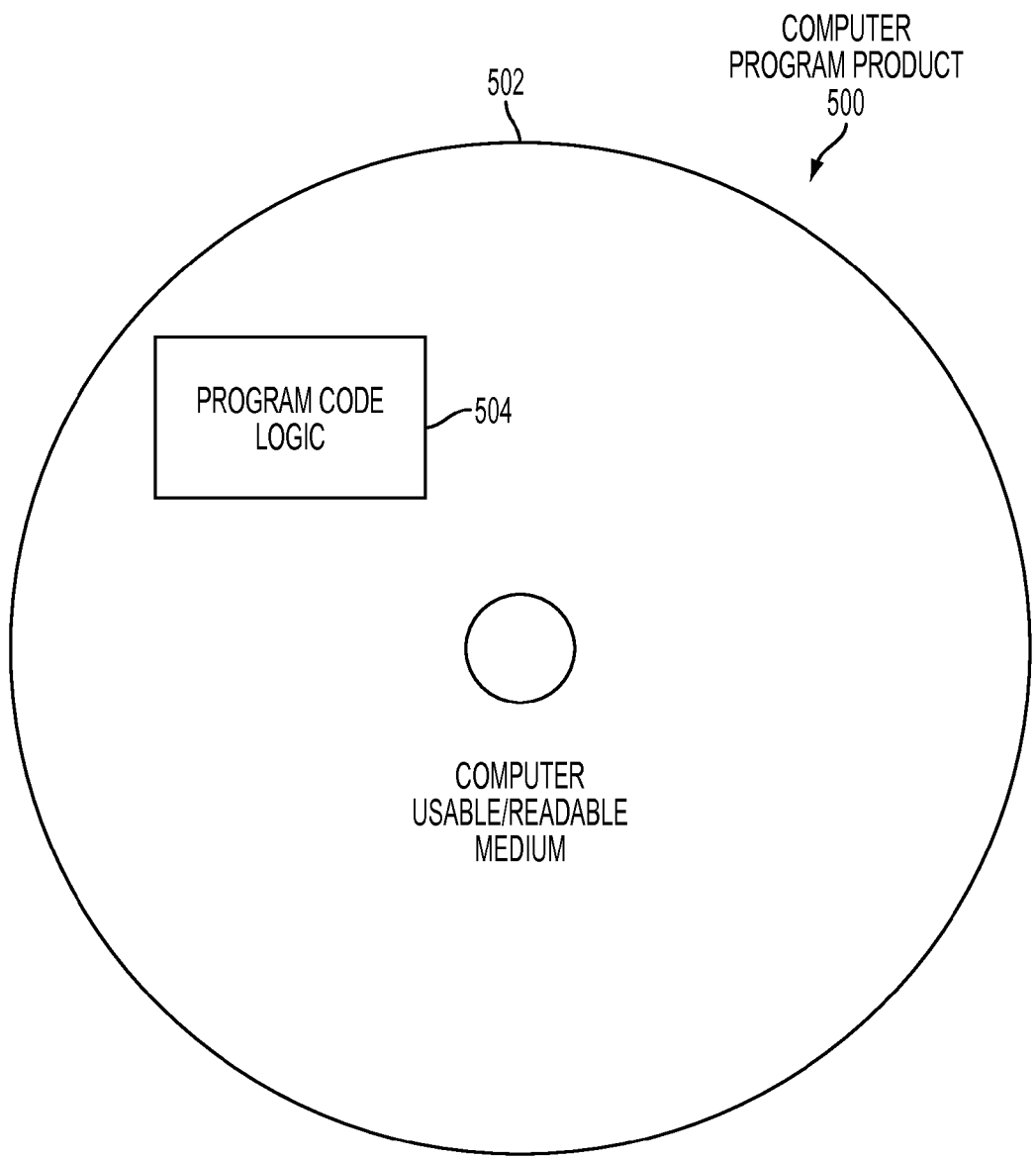
FIG. 5 illustrates a computer readable medium according to one embodiment.

As described above, embodiments can be embodied in the form of computer-implemented processes and apparatuses for practicing those processes. An embodiment may include a computer program product 500 as depicted in FIG. 5 on a computer readable/usable medium 502 with computer program code logic 504 containing instructions embodied in tangible media as an article of manufacture. Exemplary articles of manufacture for computer readable/usable medium 502 may include floppy diskettes, CD-ROMs, hard drives, universal serial bus (USB) flash drives, or any other computer-readable storage medium, wherein, when the computer program code logic 504 is loaded into and executed by a computer, the computer becomes an apparatus for practicing the invention. Embodiments include computer program code logic 504, for example, whether stored in a storage medium, loaded into and/or executed by a computer, or transmitted over some transmission medium, such as over electrical wiring or cabling, through fiber optics, or via electromagnetic radiation, wherein, when the computer program code logic 504 is loaded into and executed by a computer, the computer becomes an apparatus for practicing the invention. When implemented on a general-purpose microprocessor, the computer program code logic 504 segments configure the microprocessor to create specific logic circuits.

Figure 6A:
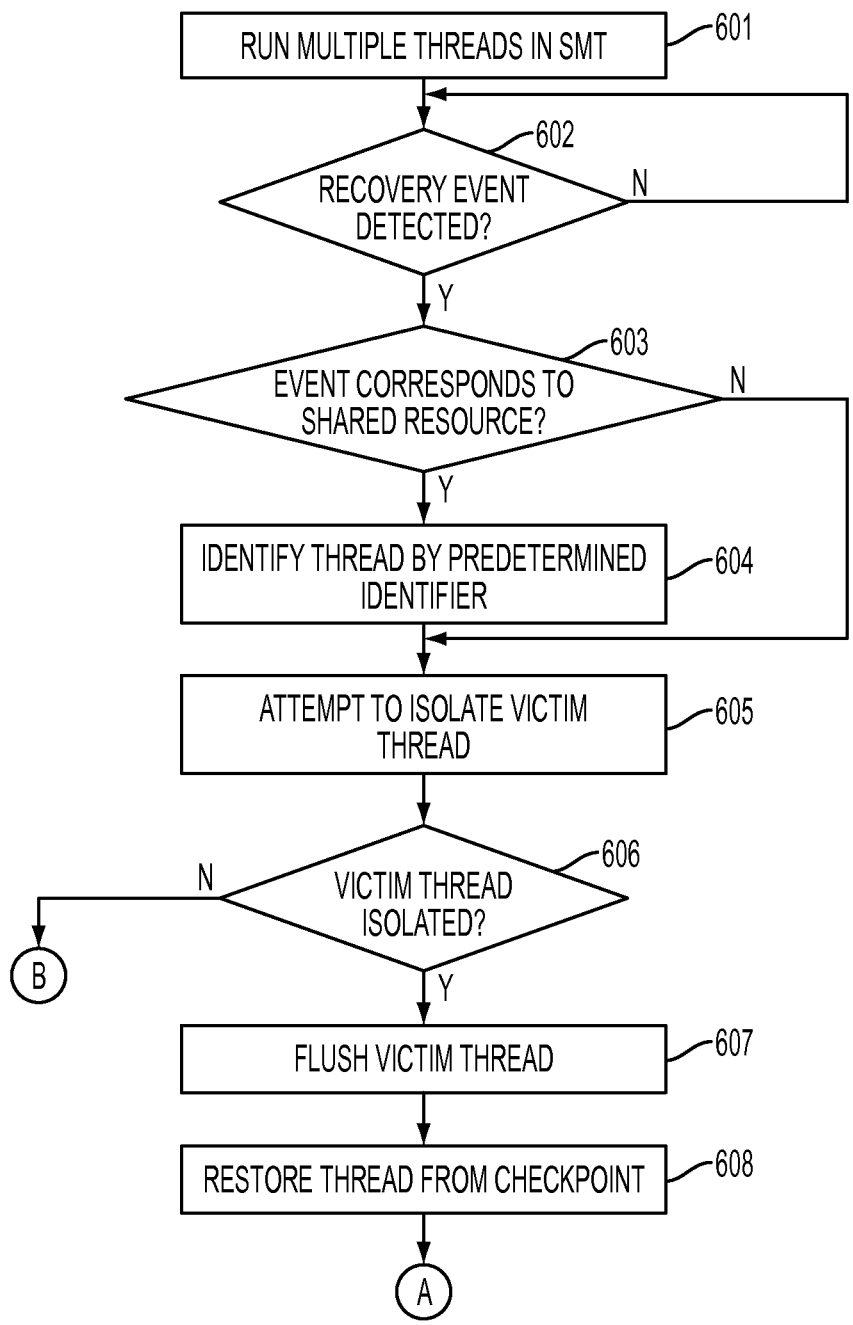
FIGS. 6A and 6B illustrate a method according to one embodiment.
Figure 6B:
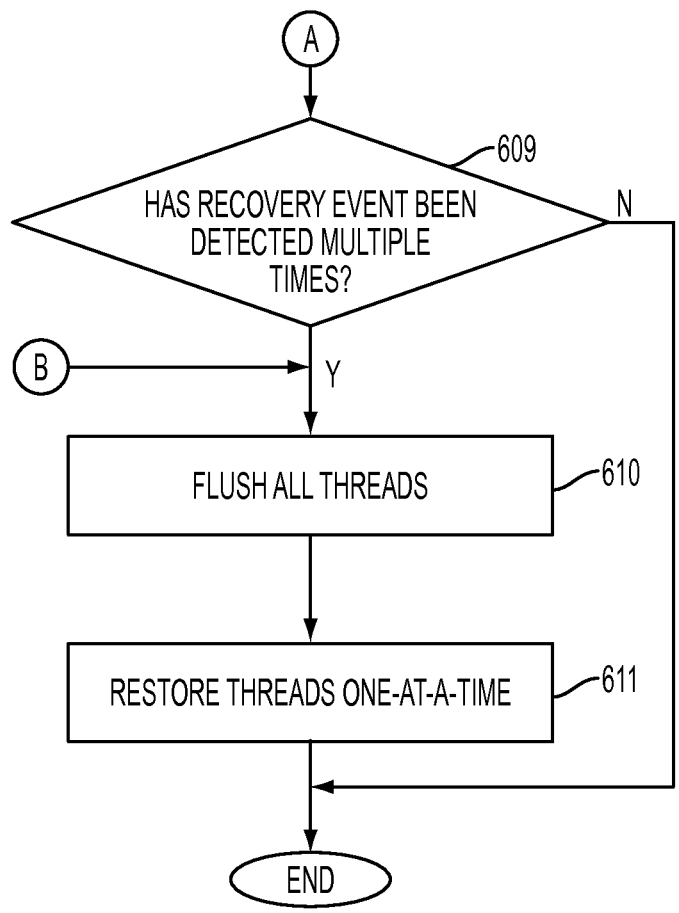

FIGS. 6A and 6B illustrate a method according to an exemplary embodiment. In block 601, multiple threads are run simultaneously on a processor, such as a multi-core processor or a simultaneous multi-threading (SMT) processing core. The multiple threads may be running simultaneously in a normal operation mode of executing instructions, and not in a test mode in which test instructions are provided or test states are provided to functional units of the SMT processing core. In block 602, it is determined whether a recovery event, such as a hardware error, is detected. For example, an error detection unit of a processor core may detect a transient error, stall state, or invalid or illegal state in a hardware component executing an instruction thread, where the hardware component may include components to store, fetch, decode, and execute instructions and data of an instruction stream.

If no recovery event is detected in block 602, the threads continue running normally. However, if a recovery event is detected in block 602, then it is determined in block 603 whether the recovery event corresponds to a shared resource. Examples of resources include registers, buffers, decoders, and execution units shared by multiple threads. If it is determined in block 603 that the recovery event corresponds to a shared resource, then the processor attempts in block 604 to identify one or more victim threads from among the threads that share the resource. For example, a thread number bit may be associated with each thread, and may be stored in a register corresponding to the shared resource. When the recovery event is detected, the register may be accessed, and the victim threads may be determined based on the thread number bit assigned to the particular victim thread.

In block 605, the processor attempts to isolate the one or more victim threads associated with the component having the error. Isolating means to prevent any threads from accessing the hardware associated with the one or more victim threads. Isolating the victim thread may include stopping threads from initiating fetching operations, storing operations, address translations, and executing operations using the hardware associated with the victim thread. For example, if the victim thread stores to a shared memory and another thread reads from the memory, the victim thread may be isolated by preventing any other threads from accessing the shared memory (or shared storage buffer, such as storage buffer 108, illustrated in FIG. 1), or the portion of the shared memory used by the victim thread.

In block 606 it is determined whether the one or more threads may be isolated. If it is determined in operation 606 that the one or more victim threads may be isolated, then in operation 607, the components associated with the one or more threads are flushed through writing control and data bits with a good state to remove any corrupted latch point values. The good state then will not result in any error indication such as bad parity. For example, any shared or dedicated component corresponding to the thread which is in turn associated with the component having the error may have its state cleared to an initializing state. In block 608, the states of the components associated with the one or more victim threads are restored to a safe and error-free state from a checkpoint. For example, the states associated with an error-free state of component may be stored in a checkpoint, and when the error is detected in a component and a victim thread is associated with the component, the components associated with the thread are flushed, the error-free states may be restored to the components, and the components may resume processing the thread.

In addition, while the components are flushed and safe states restored, the additional threads executed simultaneously by the processor may continue being processed uninterrupted. In other words, when one thread is halted and components processing the thread are flushed, the errors of the components do not halt the processing of additional threads. Instead, any additional threads having no presently-shared resources with the halted thread may continue executing while being prevented from accessing the resources shared with the halted thread until the restoration of the components associated with the halted thread is completed.

Referring to FIG. 6B, in block 609 it may be determined whether the same recovery event has been detected multiple times. For example, a predetermined threshold value may be determined to correspond to a fatally stalled thread. In block 609 it may be determined whether the recovery event has been detected a number of times equal to the threshold value. If so, then in block 610, the components processing all of the threads being processed by a processor may be flushed. In addition, if it is determined in block 606 that the halted thread could not be isolated, components processing all the threads may be flushed in block 610.

In block 611, each thread may be restored one at a time. For example, instructions corresponding to a first thread may be fetched and executed first. Then, instructions corresponding to a second thread may be fetched and executed second. The instructions for each respective thread may be fetched and executed until the instructions for each thread have been fetched and executed individually. If no recovery event is detected, then the processor may proceed to execute instructions in an SMT mode.

In embodiments of the present disclosure, detecting and correcting hardware errors may be conducted while a processor or processing system in on-line performing workload functions for a customer as well as off-line when the circuit is being tested prior to delivery to a customer. In other words, off-line testing involves executing various test patterns to determine the functionality of the processing system, while on-line testing involves executing instructions desired by a customer to control the processing system according to the customer's demands. While off-line testing involves executing patterns, on-line testing involves executing any type of instruction or series of instructions desired by the customer.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A computer-implemented method, comprising:
    running, with a simultaneous multi-threading processor, multiple threads simultaneously, where each thread corresponds to a series of instructions;
    detecting a first hardware error in one or more hardware structures of the processor;
    identifying one or more first victim threads of the multiple threads, the one or more first victim threads being associated with the one or more hardware structures;
    identifying a plurality of hardware structures holding information associated with an execution of the one or more first victim threads by the processor;
    isolating the one or more first victim threads from the rest of the multiple threads by preventing access to information held in the plurality of hardware structures by the multiple threads;
    restoring the one or more first victim threads by restoring the plurality of hardware structures to a known safe state that is stored in a checkpoint unit; and
    restarting processing of the victim threads.

2. The computer-implemented method of claim 1, wherein the information held in the plurality of hardware structures includes one or more of information held in registers, an architecture mapper, and memory.

3. The computer-implemented method of claim 1, wherein detecting the first hardware error includes detecting at least one of a stalled thread, a transient error, and an illegal state of one or more of the hardware structures corresponding to the first thread.

4. The computer system of claim 1, wherein detecting the first hardware error includes determining whether one of the plurality of hardware structures is a shared resource among the multiple threads or a dedicated resource of only the one or more first victim threads, and identifying the one or more first victim threads by a predetermined identifier based on a determination that the one of the plurality of hardware structures is a shared resource among the multiple threads.

5. The computer system of claim 4, wherein the predetermined identifier is a thread number bit, and
    each one of the multiple threads corresponds to a separate thread number bit.

6. The computer-implemented method of claim 1, wherein isolating the one or more first victim threads includes preventing other threads of the multiple threads from accessing non-checkpointed data generated from the one or more first victim threads in addition to information held in the plurality of hardware structures that are shared resources among the one or more first victim threads and any other one of the multiple threads.

7. The computer-implemented method of claim 1, further comprising:
    detecting a second hardware error associated with one or more second hardware structures of the plurality of hardware structures;
    identifying one or more second victim threads of the multiple threads, the one or more second victim threads being associated with the one or more second hardware structures;
    determining that the one or more second victim threads are incapable of being isolated; and
    flushing all of the multiple threads based on the determination that the one or more second victim threads are incapable of being isolated.

8. The computer-implemented method of claim 7, further comprising:
  restoring the multiple threads to the known safe state by restoring only one thread at a time of the multiple threads; and
  re-running the multiple threads simultaneously only based on determining that no hardware error occurred upon restoring the multiple threads to the known safe state one thread at a time.

* * * * *